United States Patent [19]

Boyd et al.

[11] Patent Number: 5,667,197

[45] Date of Patent: Sep. 16, 1997

[54] VACUUM CHAMBER GATE VALVE AND METHOD FOR MAKING SAME

[75] Inventors: Trace L. Boyd, San Jose; Martin F. Yeoman, San Ramon, both of Calif.

[73] Assignee: Lam Research Corporation, Fremont, Calif.

[21] Appl. No.: 679,357

[22] Filed: Jul. 9, 1996

[51] Int. Cl.⁶ .................................................. F16K 25/00
[52] U.S. Cl. .......................... 251/193; 137/559; 34/242
[58] Field of Search ............................ 251/193; 137/559; 34/242

[56] References Cited

U.S. PATENT DOCUMENTS

| | | | |
|---|---|---|---|
| 3,789,875 | 2/1974 | McGee | 137/554 |
| 4,340,462 | 7/1982 | Koch | 204/298 |
| 4,355,937 | 10/1982 | Mack et al. | 414/217 |
| 4,433,951 | 2/1984 | Koch et al. | 414/217 |
| 4,483,654 | 11/1984 | Koch et al. | 414/744 |
| 4,593,915 | 6/1986 | Seger et al. | 277/12 |
| 4,721,282 | 1/1988 | Shawver et al. | 251/193 |
| 4,753,417 | 6/1988 | Madocks et al. | 251/193 |
| 4,795,299 | 1/1989 | Boys et al. | 414/217 |
| 4,804,086 | 2/1989 | Grohrock | 206/328 |
| 4,917,556 | 4/1990 | Stark et al. | 414/217 |
| 5,002,255 | 3/1991 | Sawa et al. | 251/193 |
| 5,120,019 | 6/1992 | Davis, Jr. | 251/193 |
| 5,150,882 | 9/1992 | Kaneko | 251/193 |
| 5,383,338 | 1/1995 | Bowsky et al. | 137/559 |

FOREIGN PATENT DOCUMENTS 1093854 5/1985 U.S.S.R. .................. 251/193

*Primary Examiner*—Denise L. Ferensic
*Assistant Examiner*—Joanne Y. Kim
*Attorney, Agent, or Firm*—Hickman Beyer & Weaver

[57] ABSTRACT

Disclosed is a method for implementing a gate drive valve assembly used to isolate interfacing chambers. The method includes: (a) providing a drive assembly having at least one surface for attaching to a chamber, the drive assembly being mounted to the chamber such that a shaft contained within the drive assembly translates from the drive assembly through the at least one surface and along a bore in the chamber; and (b) attaching a gate plate to an end of the shaft when the shaft is at least partly within the chamber after translating along the bore.

29 Claims, 8 Drawing Sheets

VACUUM CHAMBER GATE VALVE AND METHOD FOR MAKING SAME

BACKGROUND OF THE INVENTION

The present invention relates generally to valves, and more particularly, to the gate valves used to establish isolation between interfacing chambers.

Transport modules are generally used in conjunction with a variety of substrate processing modules, which may include semiconductor etching systems, material deposition systems, and flat panel display etching systems. Due to the growing demands for cleanliness and high processing precision, there has been a growing need to reduce the amount of human interaction during between processing steps. This need has been partially met with the implementation of transport modules which operate as an intermediate handling apparatus (typically maintained at a reduced pressure, e.g., vacuum conditions). By way of example, a transport module may be physically located between one or more clean room storage facilities where substrates are stored, and multiple substrate processing modules where the substrates are actually processed, e.g., etched or have deposition performed thereon.

In this manner, when a substrate is required for processing, a robot arm located within the transport module may be employed to retrieve a selected substrate from storage and place it into one of the multiple processing modules. As is well known to those skilled in the art, transport modules are generally employed to "transport" substrates among multiple storage facilities and processing modules in a "cluster tool architecture."

FIG. 1 depicts a typical cluster tool architecture 100 illustrating the various chambers that interface a transport module 106. Transport module 106 is shown coupled to three processing modules 108a–108c which may be individually optimized to perform various fabrication processes. By way of example, processing modules 108a–108c may be implemented to perform transformer coupled plasma (TCP) substrate etching, layer depositions, and/or sputtering. Connected to transport module 106 is a load lock 104 that may be implemented to provide substrates to transport module 106.

Load lock 104 may be coupled to a clean room 102 where substrates are stored. In addition to being a retrieving and serving mechanism, load lock 104 may also serves as a pressure varying interface between transport module 106 and clean room 102. Therefore, transport module 106 may be kept at a constant pressure (e.g., vacuum), while clean room 102 is kept at atmospheric pressure. To prevent leaks between modules during pressure varying transitions, or to seal off a processing module from transport module 106 during a processing, various types of gate drive valves are used to isolate the various modules. For more information on gate drive valves, reference may be made to U.S. Pat. No. 4,721,282, which is hereby incorporated by reference.

FIG. 2 is a three dimensional perspective of a conventional interfacing arrangement 200 having a valve body 205 positioned between a processing module 108 and transport module 106. As shown, valve body 205 has a valve drive assembly 206 positioned below valve body 205. Valve drive assembly 206 generally includes a number of mechanical interconnections, electrical connections and gas conduit networks designed to raise and lower a shaft 208 which is connected to a gate plate 210. As shown, valve body 205 includes two interface ports 216 which provide a passageway for substrates to be transported in and out of processing module 108. As can be appreciated, conventional cluster architectures typically suffer in having a large footprint when multiple valve bodies 205 are placed between modules that interface with transport module 106.

As is well known in the fabrication technology industry, clean room space is quite expensive to construct and maintain. Consequently, cluster architectures having large footprints disadvantageously drive up the costs associated with building and maintaining fabrication clean rooms. To combat this problem, gate drive body 205 and drive assembly 206 manufacture's have developed narrower and thinner housing structures. Although some clean room space is salvaged, the resulting housing structure is typically too weak to withstand periodic disassembly required to maintain and service gate drive body 205 and drive assembly 206.

By way of example, to establish a vacuum-tight seal between facets 212 of processing module 108 and transport module 106, O-rings 220 are conventionally sandwiched between processing module 108 and transport module 106. Typically, the modules are bolted together, pneumatics (e.g., air supply lines) and gas lines are connected and tested, electrical connections are connected and tested, and computer connections are made to various testing computers running testing software. Thus, modules 106 and 108 must be separated and these interfacing connections disconnected and then reconnected.

Also, an O-ring 221 located within valve body 205 will typically require periodic replacement. When this happens, a bonnet plate 222 must be removed from the bottom surface of valve body 205. However, if the chambers are not separated before removing bonnet plate 222, the forces exerted on valve body 205 by the adjoining modulus 106 and 108 will typically cause serious inward warping to valve body 205. That is, bonnet plate 222 generally provides the essential structural support to prevent the inward collapse of valve body 205. Therefore, if bonnet plate 222 is removed without complete disassembly, the reinstallation of drive assembly 206 and bonnet plate 222 will be very difficult since the original structural shape of valve body 205 will no longer be optimized to receive the internal components.

Consequently, the replacement of O-ring 221 as well as O-rings 220 will necessitate the disassembly of the entire system including mechanical interconnections and electrical contacts located inside of valve body 205 and drive assembly 206. In addition, additional warping may occur during disassembly, and the valve body may have to be replaced or faced-off at the expense of reduced throughput when the entire cluster architecture is down for repair.

In view of the forgoing, what is needed is a gate drive valve that provides suitable isolation between interfacing chambers without increasing the footprint of a cluster architecture and without sacrificing the structural integrity of the valve body and drive assembly.

SUMMARY OF THE INVENTION

The invention fills this need by providing, in one embodiment, a method for implementing a gate drive valve assembly used to isolate interfacing chambers. The method includes: (a) providing a drive assembly having at least one surface for attaching to a chamber, the drive assembly being mounted to the chamber such that a shaft contained within the drive assembly translates from the drive assembly through the at least one surface and along a bore in the chamber; and (b) attaching a gate plate to art end of the shaft when the shaft is at least partly within the chamber after translating along the bore.

In another embodiment, an apparatus for establishing a seal between interfacing chambers from within a transport chamber is disclosed. In this embodiment, the apparatus includes: (a) a drive assembly having at least one surface for attaching to the transport chamber, and the drive assembly being mounted to the transport chamber such that a shaft contained within the drive assembly translates from the drive assembly through the at least one surface and along a bore in the transport chamber; and (b) a gate plate fastened to an end of the shaft when the shaft is at least partly within the transport chamber after translating along the bore.

In yet another embodiment, a apparatus for implementing a gate drive valve assembly used to isolate interfacing chambers is disclosed. The apparatus includes: (a) means for providing a drive assembly having at least one surface for attaching to a chamber, the drive assembly being mounted to the chamber such that a shaft contained within the drive assembly translates from the drive assembly through the at least one surface and along a bore in the chamber; and (b) means for attaching a gate plate to an end of the shaft when the shaft is at least partly within the chamber after translating along the bore.

BRIEF DESCRIPTION OF THE DRAWINGS

The invention, together with further advantages thereof, may best be understood by reference to the following description taken in conjunction with the accompanying drawings in which.

DETAILED DESCRIPTION OF THE PREFERRED EMBODIMENTS

Figure 1:
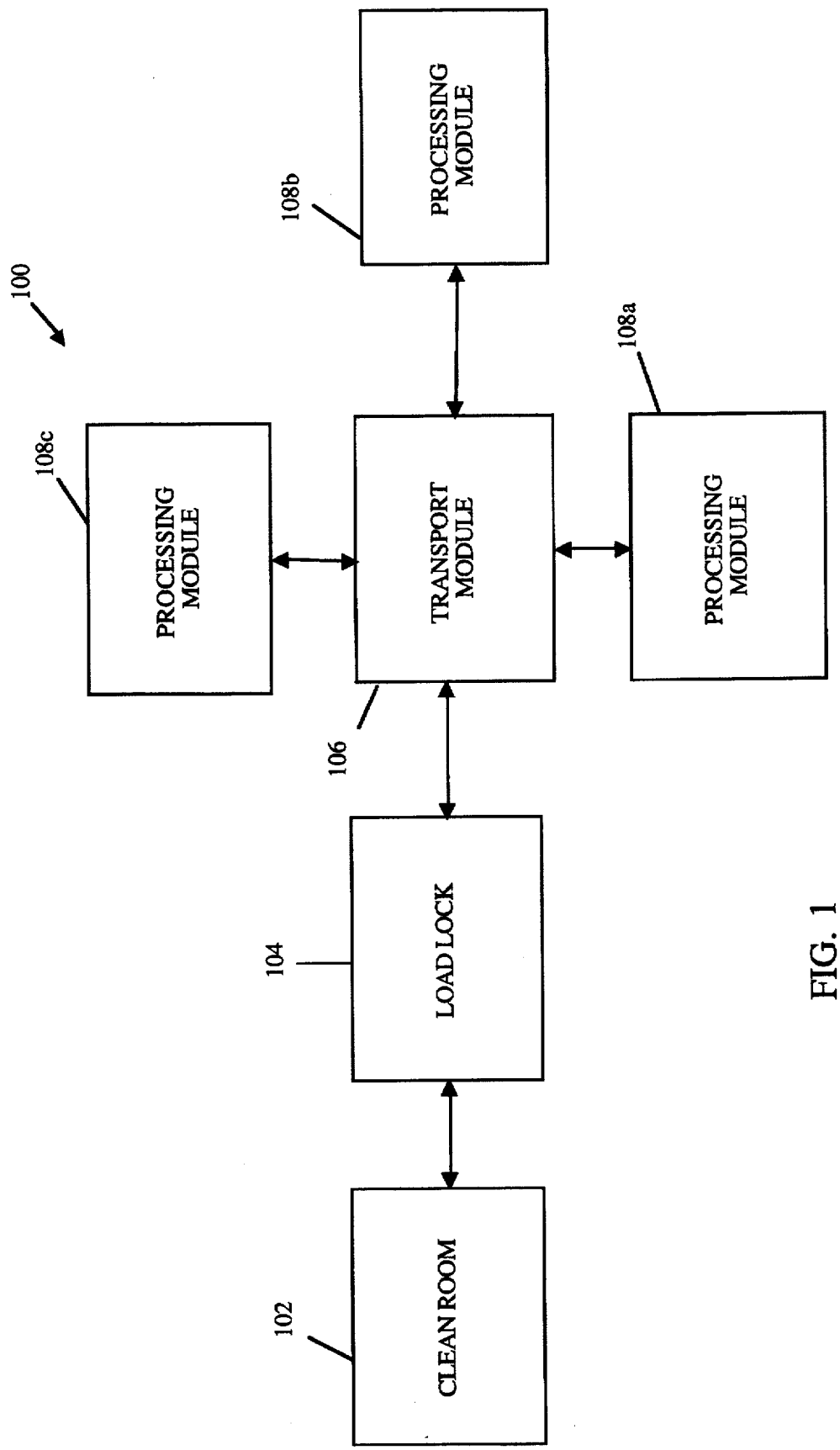
FIG. 1 is diagrammatic illustration of a typical cluster tool architecture which illustrates how various processing modules may be coupled to a transport module.
Figure 2:
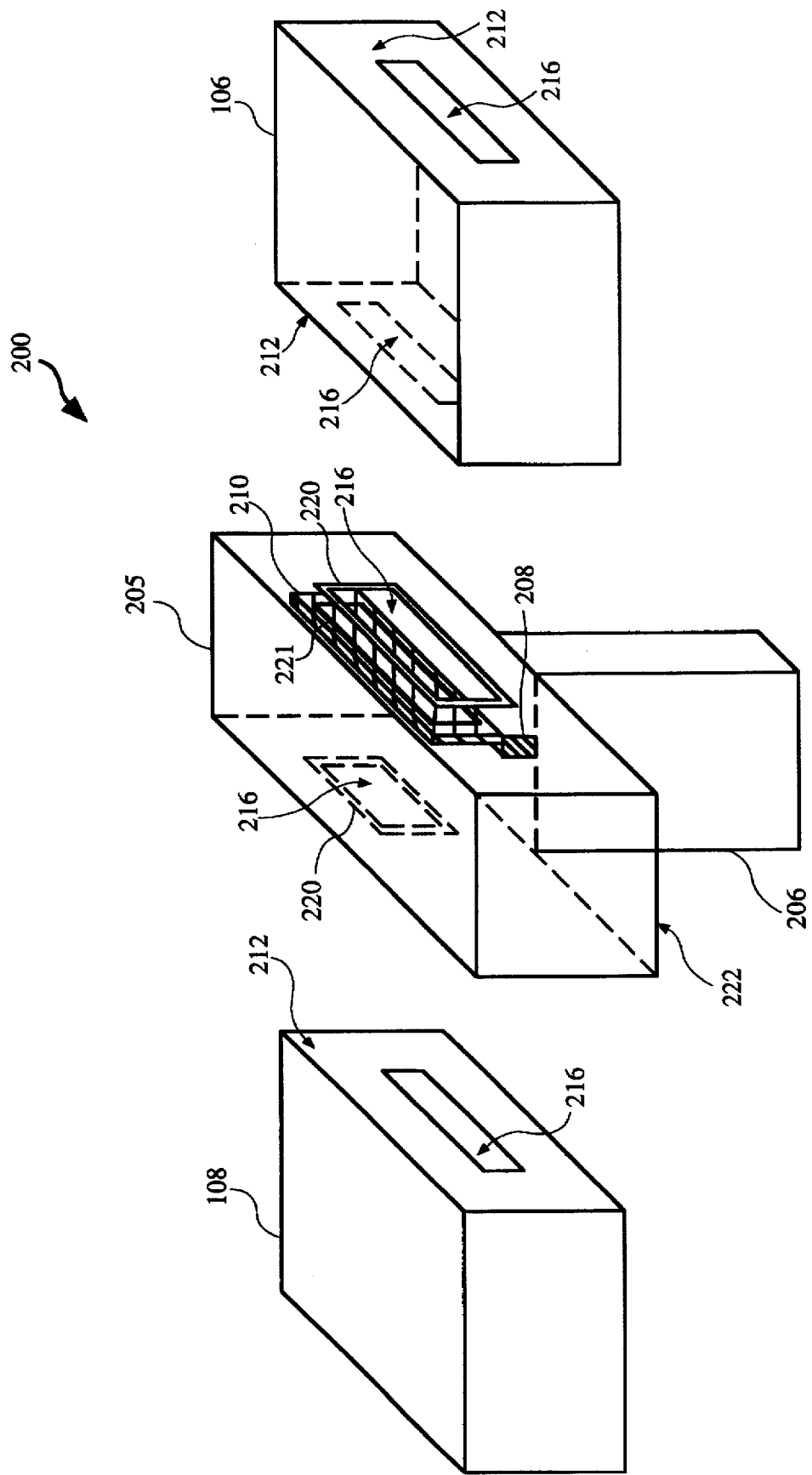
FIG. 2 is a three dimensional perspective of a conventional interfacing arrangement having a valve body positioned between a processing module and a transport module.

As described above, FIG. 1 schematically illustrates a typical cluster tool architecture and the relative positioning of transport module 106. FIG. 2 was used to describe some of the disadvantages associated with bulky gate drive valve assemblies.

An invention is described for improving the implementation of gate drive valves in large cluster architectures. In the following description, numerous specific details are set forth in order to provide a thorough understanding of the present invention. It will be obvious, however, to one skilled in the art, that the present invention may be practiced without some or all of these specific details. In other instances, well known manufacturing steps have not been described in detail in order not to unnecessarily obscure the present invention.

Figure 3A:
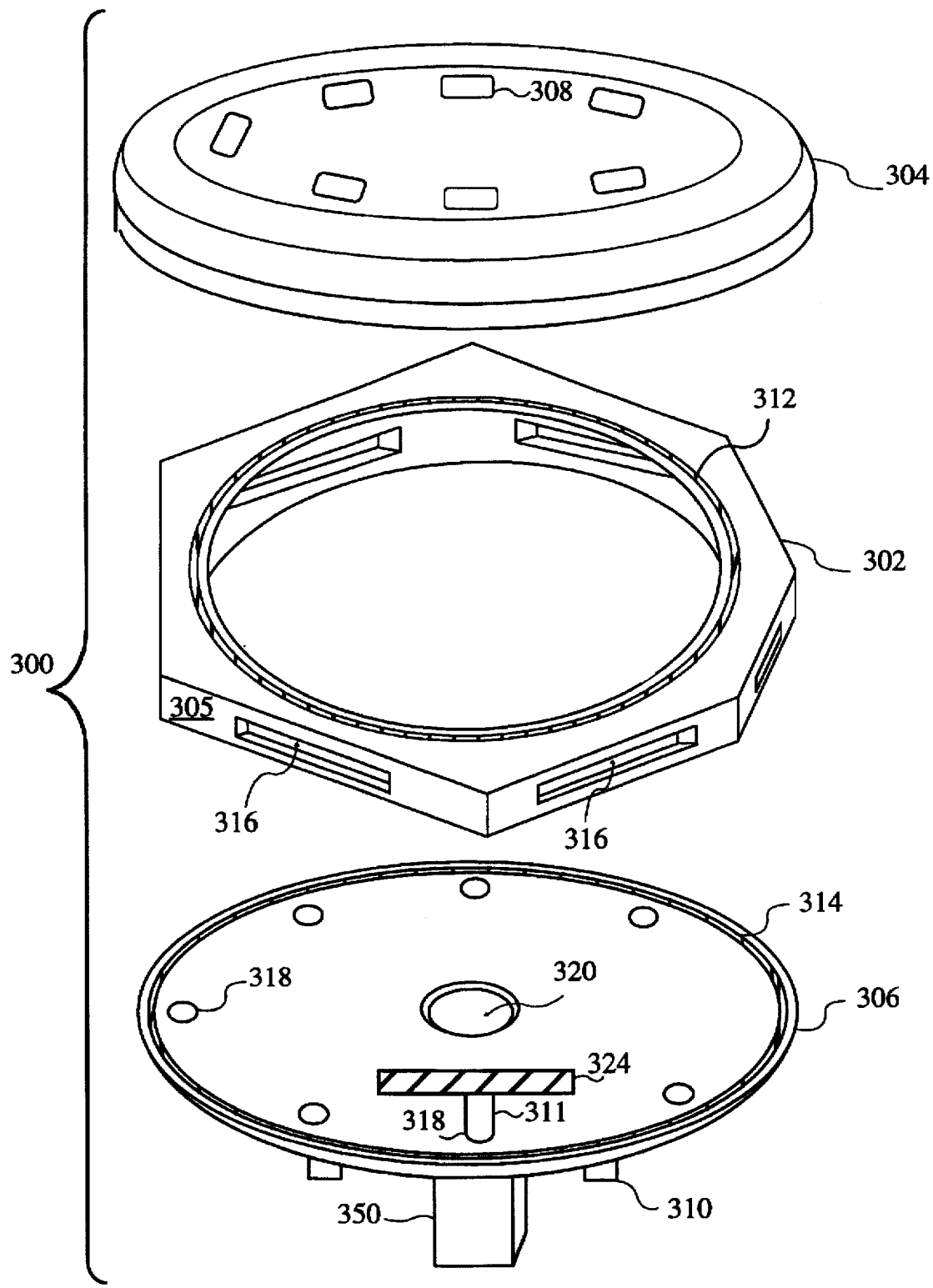
FIG. 3A is an exploded view of a transport chamber which generally includes a chamber housing, a bottom plate, and a top plate all assembled to form a vacuum-tight chamber in accordance with one embodiment of the present invention.
Figure 3B:
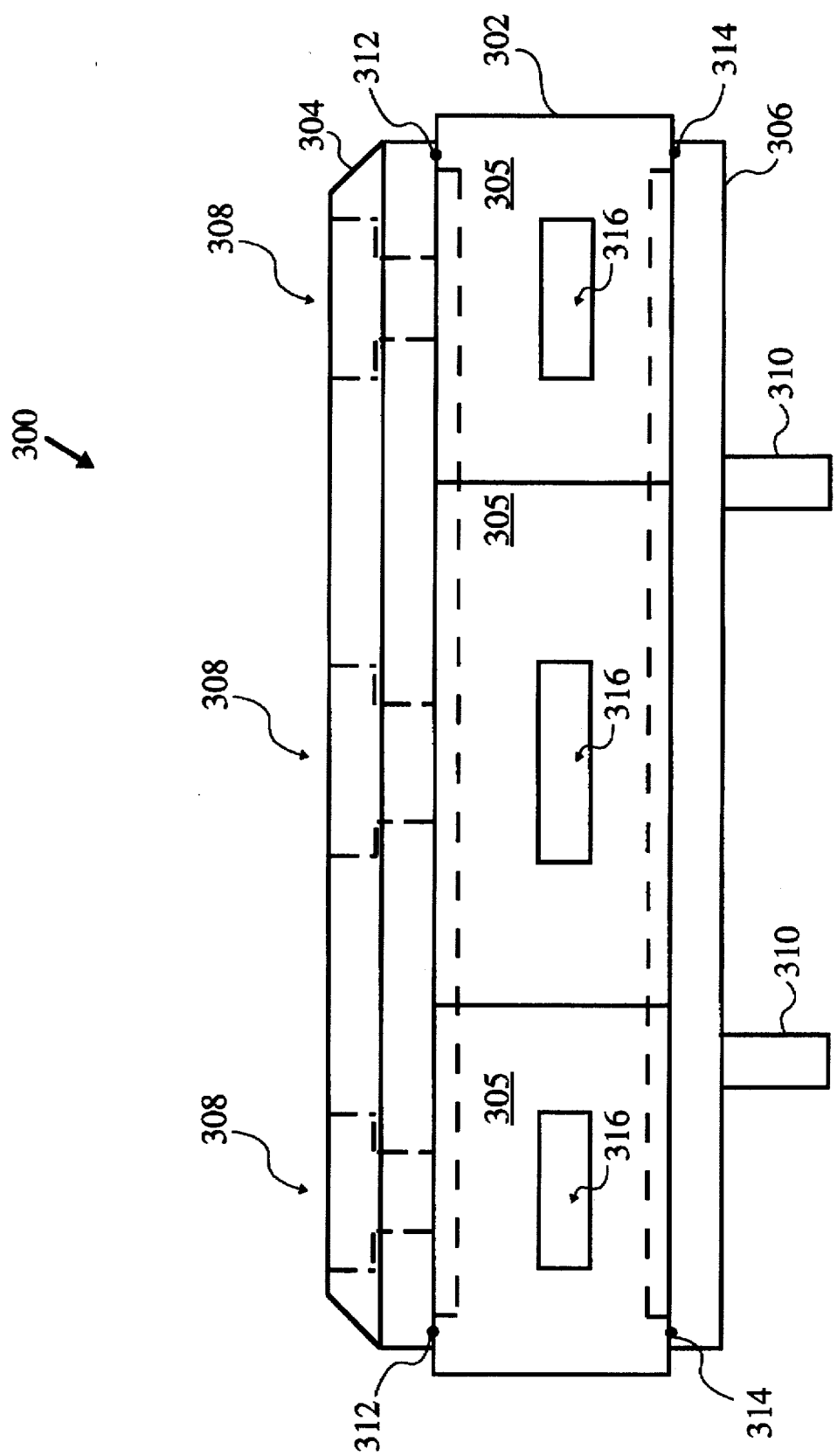
FIG. 3B is a side-view of a transport chamber manufactured in accordance with one embodiment of the present invention.

FIG. 3 is an exploded view of a transport chamber 300 which generally includes a chamber housing 302, a bottom plate 306, and a top plate 304 all assembled to form a vacuum-tight chamber. In one embodiment, chamber housing 302 may have any number of facets 305 which provide a surface area for other chambers to meet up against chamber housing 302. In this manner, a vacuum-tight seal may be formed between the various processing chambers and load lock chambers interconnected to transport chamber 300 as described in FIG. 1.

As will be described in greater detail with reference to FIGS. 4 through 6 below, a gate plate 324 is connected to a shaft 311 which passes through a bore 318 in bottom plate 306. Although any number of drive assemblies may be connected to transport chamber 300, a single drive assembly 350 is shown to illustrate one preferred method of attachment. In this embodiment, gate plate 324 and its associated drive assembly 350 are preferably implemented to isolate chambers external to transport chamber 300. In this manner, proper isolation may be maintained between interfacing chambers during operation. By way of example, when a load lock chamber (not shown for ease of illustration) is joined up against a facet 305 of transport chamber 300, a vacuum-tight seal may be established between the interface when gate plate 324 located within transport chamber 300 is compression against an internal interface port 316.

As shown, top plate 304 will typically sit over a top surface of chamber housing 302, and an O-ring seal 312 may be positioned such that a vacuum-tight seal is made when top plate 304 is bolted down to chamber housing 302. Similarly, bottom plate 306 is preferably bolted up against chamber housing 302 such that a vacuum-tight seal is made when O-ring seal 314 is positioned between chamber housing 302 and bottom plate 306.

Bottom plate 306 is also shown having a robot drive mounting port 320 designed to allow a robot arm drive (not shown for ease of illustration) to be installed from beneath bottom plate 306. As mentioned above, bores 318 are defined around the perimeter of bottom plate 306 in order to provide a passage for inserting a shaft 311 of a drive assembly 350 into transport chamber 300.

Still referring to FIG. 3A, top plate 304 is shown having view ports 308 designed to provide viewing and access capabilities into transport chamber 300. By way of example, view ports 308 may also provide an efficient passage for installing and replacing consumable O-rings that provide an intimate seal between gate plate 324 and interface ports 316. In addition, view ports 308 also provide an easy access for removing gate plate 324 from shaft 311 when drive assembly 350 needs to be removed for maintenance from transport chamber 300.

Although view ports 308 are shown positioned over each interface port 316, it should be understood that view port windows 308 may be optional. If view port windows are not included, top plate 304 may easily be removed to access the various gate plates and consumable O-rings. Further, the positioning and shape of view port windows 308 may be modified without departing from the spirit and scope of this embodiment. In one embodiment, view port windows 308 may be a clear two inch thick polycarbonate plastic which may be sealed down to top plate 304 by an O-ring. In this manner, a vacuum-tight seal may be maintained when transport chamber 300 is brought down to vacuum conditions. In this embodiment, Lexan® plastic which is available from General Electric Plastics of Pittsfield, Mass., can be used to make view port windows 308.

For more information on transport chambers and methods for making the same, reference may be made to U.S. patent application Ser. No. 08/677,401, filed on the same day as the instant application, naming Trace L. Boyd and Eric A. Terbeek as inventors, and entitled "Transport Chamber and Method for Making Same." This application is hereby incorporated by reference.

Figure 4:
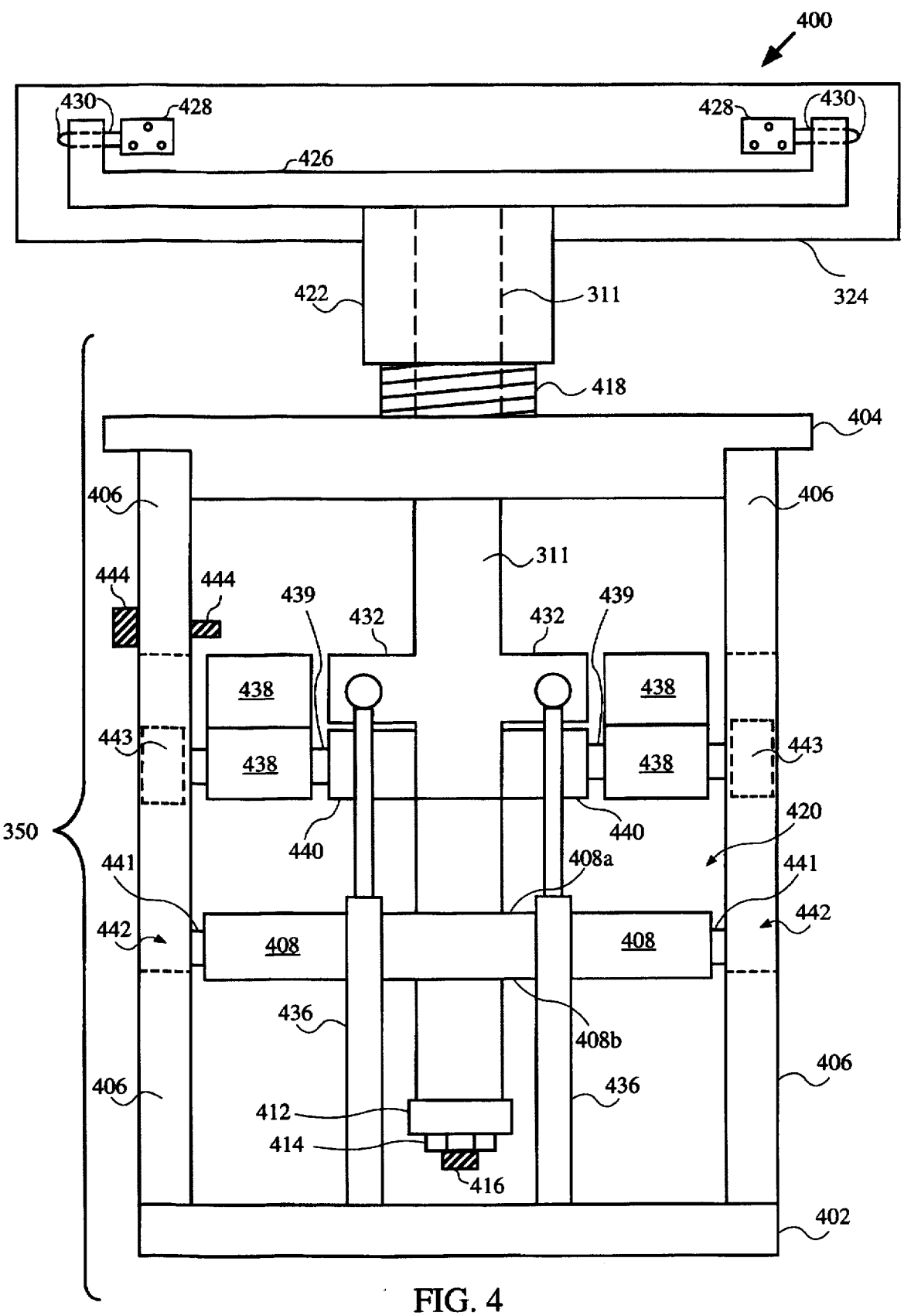
FIG. 4 is back-side perspective of a gate drive valve which includes a drive assembly and a gate in accordance with one embodiment of the present invention.

FIG. 4 is backside perspective of a gate drive valve 400 which includes a drive assembly 350 and a gate 324. In this embodiment, drive assembly 350 is generally contained within a drive housing which includes a bottom plate 402, a top plate 404, and side walls 406. Although drive assembly 350 may be attached to transport chamber from any angle or surface which allows proper functionality, drive assembly 350 is preferably attached to bottom plate 306 of transport chamber 300 as shown in FIG. 3A. A preferred mode of attachment may be made through the implementation of screws and/or any other suitable type of fastening device.

A shaft 311 is preferably shown surrounded by a cylindrical bellows shield 422 which contains a smaller diameter cylindrical welded bellows 418. When drive assembly 350 is attached to bottom plate 306, shaft 311 is slid up through a bore 318 from below bottom plate 306, and bellows shield 422 is allowed to reside within transport chamber 300. In this embodiment, welded bellows 418 further establishes a vacuum seal between transport chamber 300 and drive assembly 350. Further, welded bellows 418 insures freedom of axial and angular movement during opening and closing motions.

In this embodiment, an O-ring (not shown for ease of illustration) is preferably placed between top plate 404 of drive assembly 350 and bottom plate 306 of transport chamber 300 to maintain a vacuum-tight seal during processing. Further, welded bellows 418 and bellows shield 422 are preferably allowed to sit into a well (not shown) in top plate 404 so that shaft 311 may traverse downward into the well when gate 324 is in an open position. It should be appreciated that maintaining a vacuum-tight seal between drive assembly 350 and bottom plate 306 is important, since in operation transport chamber 300 is typically brought down to vacuum conditions while drive assembly 350 lies under atmospheric conditions.

Referring now to an internal region 420 of drive assembly 350, shaft 311 is shown having a block feature 432 which is integral with shaft 311. Shaft 311 is generally shown extending vertically upward out through top plate 404, and vertically downward. As shown, the lower portion of shaft 311 will preferably be guided through a cylindrical path 408a defined in a bearing block 408 which is preferably secured to each of side walls 406. Although any securing mechanism may be used, a preferred way of securing bearing block 408 to side walls 406 is by use of a pin 441 to allow rotational movement of bearing block 408.

By way of example, during operation, shaft 311 travels downward when gate 324 is shifted to an open position, and upward when gate 324 is compressed into a closed position. Further, when gate 324 is lowered downward towards bottom plate 402, shaft 311 and block feature 432 are also lowered while simultaneously compressing gas springs 436.

In this embodiment, gas springs 436 are fixedly attached to block feature 432 and bottom plate 402. In this manner, the weight of gate 324 will not abruptly cause shaft 311 to slide down when gate 324 is opened, and a vertical lifting force is also provided when gate 324 is slid into a closed position. That is, gas springs 436 will naturally tend to expand and provide a vertical upward force against block feature 432. Therefore, the opening and closing motions of gate 324 are performed in smooth controlled intervals.

It should be understood that gas springs 436 may be substituted for any suitable counterweight producing mechanism. In this embodiment, gas springs 436 are preferably model No. 16-2-172-100-A101-B101 which may be obtained from Suspa, Inc. of Grand Rapids, Mich. By way of example, gas springs 436 may be substituted with extension or compression coil springs, air cylinders, counterweights and pulleys, electrical cylinoids, mechanical motors, etc.

Shaft 311 and block feature 432 are also shown connected to a pair of link arms 438, and a central air cylinder block 440 is suspended between link arms 438 by bearing pins 439 which provide pivotal freedom to link arms 438. Once link arms 438 and air cylinder block 440 are assembled, cam rollers 443 are attached to each side of link arms 438 such that cam rollers 443 are guided along roller channels 442 defined in side walls 406.

Therefore, in operation, cam rollers 443 may freely travel along roller channel 442 in an upward direction when gate 324 is moved towards a closed position, and travel in a downward direction when gate 324 is moved towards an open position. Although suitable rollers may be obtained from any commercial suppliers, cam rollers 443 may be obtained from, for example, McGill Cam Followers of Valparaiso, Ind.

For illustration purposes, when gate 324 is moved in the upward direction (or closed), shaft 311 will slide through bearing block 408 until a point of highest vertical travel has been established. To prevent gate 324 from further vertical travel, a vertical stop 412 may meet up against a bottom surface 408b of bearing block 408 and thereby prevent further vertical travel of shaft 311. At this point, link arms 438 rotate about block feature 432 as air cylinder block 440 continues to move up such that gate 324 begins to move in a lateral direction and compress against an interior insert plate and O-rings that surround interface ports 316.

The insert plate and O-rings are discussed in greater detail in U.S. patent application Ser. No. 08/675,994, filed on the same day as the instant application, naming Trace L. Boyd, Richard D. Beer, Eric A. Terbeek and Vernon W. H. Wong as inventors, and entitled "Chamber Interfacing O-Rings and Method for Implementing Same." This application is hereby incorporated by reference.

By way of example, shaft 311, link arms 438 and air cylinder block 440 employ what is referred to as a "modified 4-bar wedge-type mechanism" which includes two distinct motions:(1) a vertical upward and downward motion, and (2) a second rotating arc motion (e.g., lateral movement) towards the sealing O-rings and insert plate. Thus, the lateral rotating arc motion produces a wedge-type force which essentially compresses gate 324 onto the insert plate and O-rings to produce a vacuum-tight seal. Further, as mentioned above, a biasing-type force is also applied to the 4 bar wedged mechanism by gas springs 436 which assures that an appropriate functional orientation is maintained.

The modified 4-bar wedge-type mechanism further provides an over-center locking characteristic which is capable of maintaining gate 324 in a closed position if air cylinders 502 (which will be described in greater detail with reference to FIG. 5A) fail to provide adequate upward forces.

In one embodiment, vertical stop 412 is preferably secured to shaft 311 by a nut 414 that is threaded to a shaft portion 416. Vertical stop 412 may also be threaded onto shaft portion 416 to further facilitate adjustments to vertical stop 412 in cases where more or less vertical travel is required of shaft 311. By way of example, the appropriate vertical travel of shaft 311 will typically be dictated by positioning of the interface port of the chamber requiring a gate drive valve.

Still referring to FIG. 4, in this embodiment, a support bar 426 is preferably attached to shaft 311 after it has been at least partially inserted into the transport chamber. Next, support bar 426 will preferably be attached to gate 324 by pivotally connecting support bar 426 to a pair of pivot blocks 428 that are screwed onto gate 324. For example, a pair of hinge pins 430 may be used to interconnect support bar 426 to pivot blocks 428. In this manner, gate 324 may be allowed to tilt about pivot blocks 428 which will further assure that gate 324 will make a vacuum-tight seal against an insert plate and O-ring (not shown) lying within transport chamber 300.

As shown, drive assembly 350 may also have a safety latch 444 built into a sidewall 406. Safety latch 444 is particularly suited to prevent the closure of gate 324 in the midst of a substrate transfer in or out of transport chamber 300. As is well known in that art, safety latch 444 may be any commercially available latch capable of preventing unwanted closures.

Figure 5A:
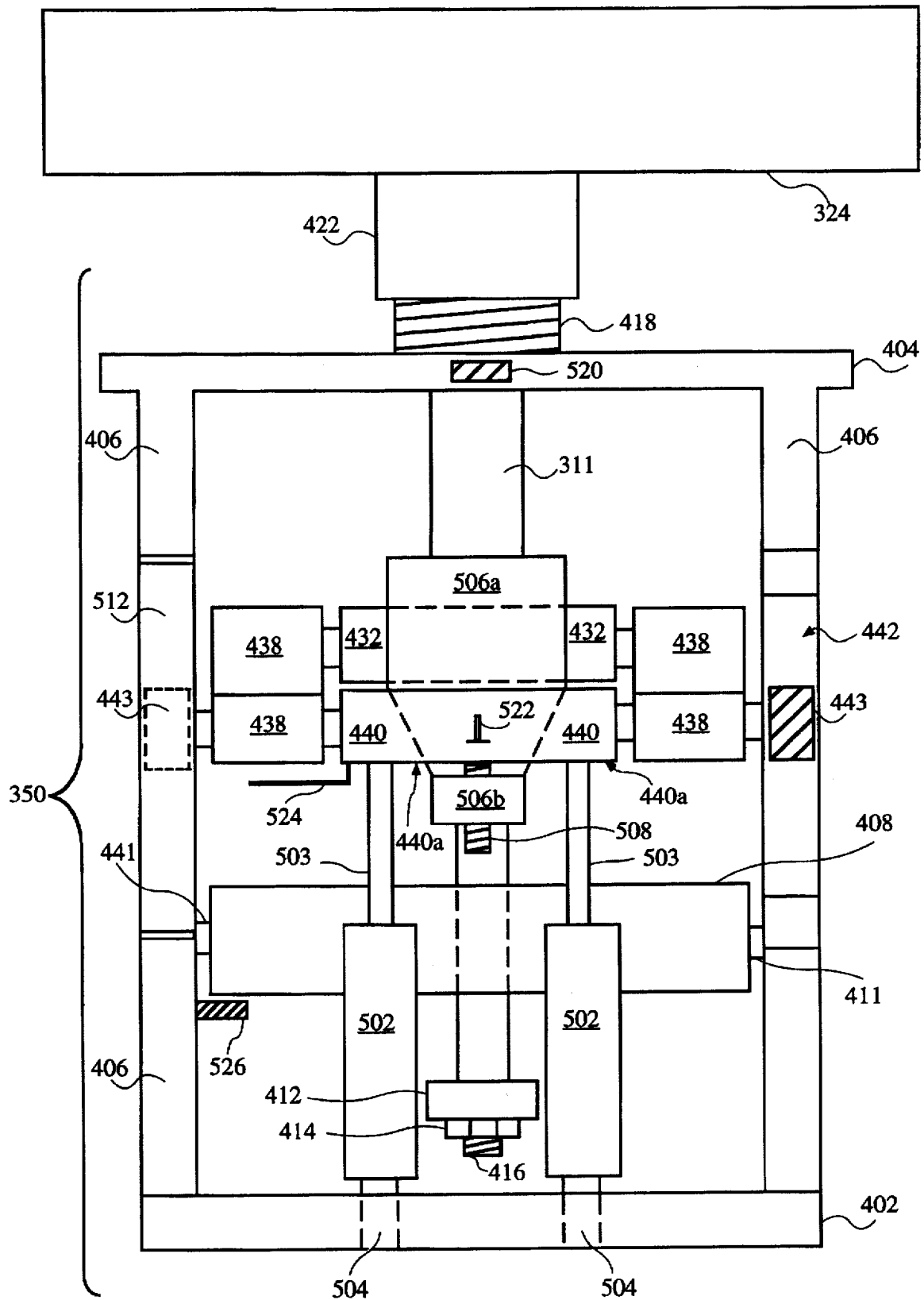
FIG. 5A is a front-side perspective of the gate drive valve of FIG. 4 in accordance with one embodiment of the present invention.

FIG. 5A is a front view of drive assembly 350 and gate 324. For illustration purposes, one roller channel 442 is shown exposed without a hardened steel bar 512 which partially defines roller channel 442. In this embodiment, the inner surface of hardened steel bar 512 will preferably be the surface against which cam rollers 443 will exert lateral forces when shaft 311 travels to a closed or open position. Further, contrasted with un-hardened steels or alloys, hardened steel bar 512 may also be more wear resistant to extended use. In addition, hardened steel bar 512 is removable which advantageously facilitates access to internal components such as cam rollers 443.

This perspective shows a pair of air cylinders 502 that may be used facilitate the raising and lowering of shaft 311, link arms 438, and air cylinder block 440 of the 4-bar wedge mechanism. That is, to take gate 324 to a closed compressed position, air cylinders 502 may preferably raise the 4-bar wedge mechanism in a vertical upward path and then in a second rotating arc path by applying continued force to air cylinder block 440 of the 4-bar wedge mechanism. By way of example, air cylinders 502 are preferably equipped with air ports for actuating extension and contraction of a pair of air cylinder shafts 503 contained within air cylinders 502.

In this embodiment, two gas lines are preferably coupled to each of the two air cylinders 502 which enables the delivery and extraction of gas into and out of each of the air cylinders 502. Preferably, the delivery and extraction of gas will be carried out in parallel such that about half the force required to lift the modified 4-bar wedge-type mechanism is shared by each air cylinder 502.

By way of example, air cylinder shafts 503 may preferably be pivotally coupled to a bottom surface 440a of air cylinder block 440. In this manner, the extension force provided by air cylinder shafts 503 will further facilitate the upward and lateral forces necessary to sealably lock gate 324 against the aforementioned insert plate containing an O-ring. Further, air cylinders 502 are shown connected to bottom plate 402 at pre-defined connection points 504.

In this embodiment, the gas exchanged into and out of air cylinders 502 may be a nitrogen gas or any other suitable gas/liquid suitable for actuating air cylinders 502. Although air cylinders 502 may be any commercially available cylinders capable extending and contracting air cylinder shafts 503, suitable air cylinders are available from Clippard Instrument Laboratories, Inc., of Cincinnati, Ohio.

This perspective also provides a front view of link arms 438 which are connected to air cylinder block 440 through bearing pins 439. As mentioned above, link arms 438 are attached to block feature 432 such that link arms 438, air cylinder block 440, and cam rollers 443 may move as an "interconnected unit" in an upward or downward (e.g., vertical) direction. In this manner, block feature 432 which is an integral part of shaft 311, and is pivotally connected to link arms 438, may move in an upward and then lateral locking direction when gate 324 is compressed to the closed position. Similarly, when gate 324 is placed into the open position, gate 324 will first move in a lateral direction away from the insert plate and O-ring, and then begin its downward travel. It should be appreciated that in both upward and downward travel, shaft 311 and its interconnected link arms 438 are guided by cam rollers 443 which roll along roller channel 442.

In one embodiment, drive assembly 350 is provided with a link adjuster having a vertical portion 506a that is attached to block feature 432 and a horizontal portion 506b that is perpendicular to vertical portion 506a. The link adjuster therefore forms an "L" shape, and horizontal portion 506a contains an adjustment screw 508. Adjustment screw 508 will therefore facilitate operational alignments of link arms 438 and air cylinder block 440.

Figure 5B:
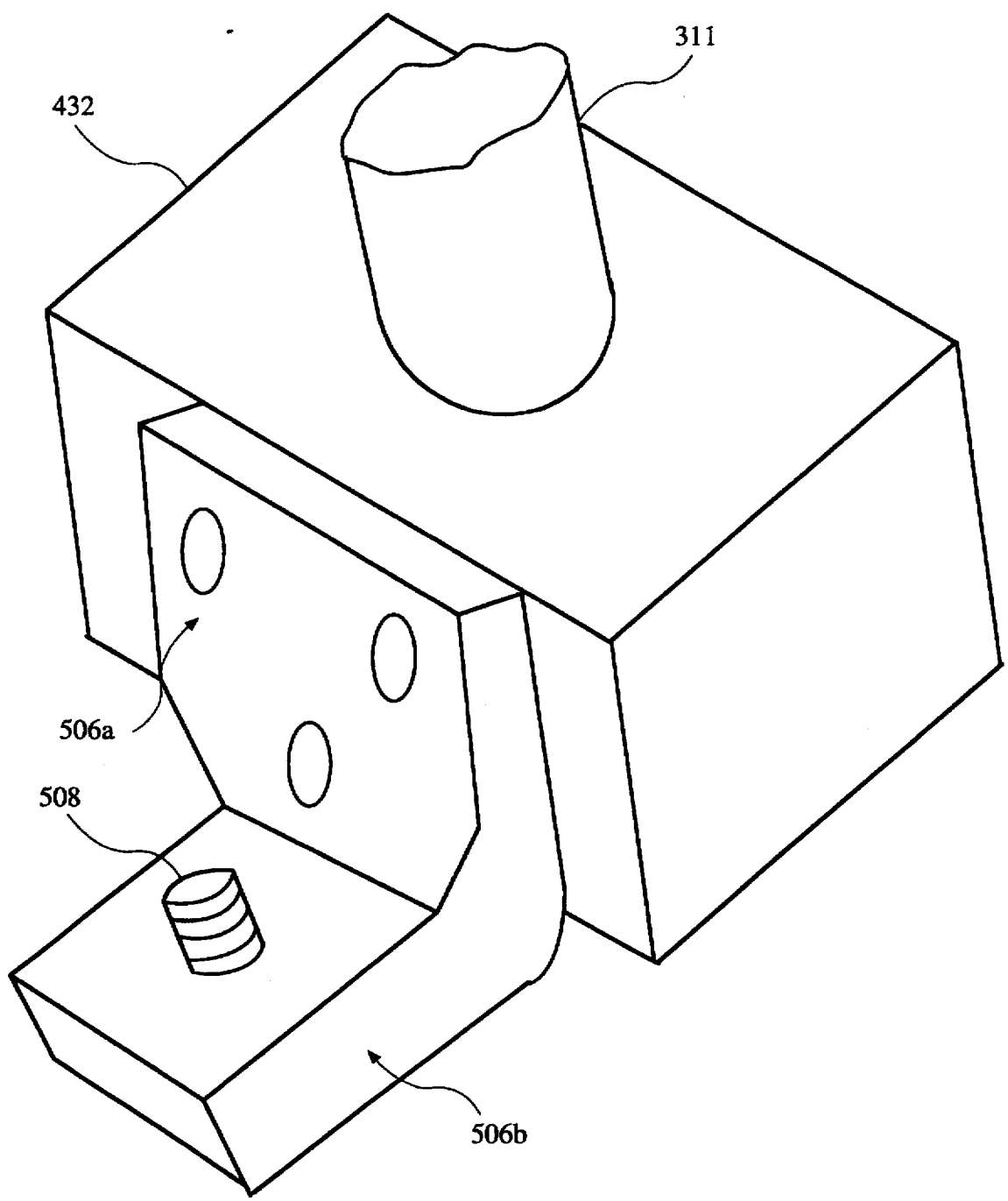
FIG. 5B is a three dimensional cut-away segment which illustrates an "L" shape link adjuster in accordance with one embodiment of the present invention.

FIG. 5B is a three dimensional segment of block feature 432 which is shown having vertical portion 506a of the link adjuster attached to a surface of block feature 432, and horizontal portion 506b extending perpendicular to shaft 311. As described above, adjustment screw 508 will preferably facilitate operational alignments and vertical adjustments of air cylinder block 440.

To monitor the operation of drive assembly 350 and gate 324, various sensors may be placed along the motion path of shaft 311. By way of example, when gate 324 is placed into its closed position, link arms 438 will travel upward thereby rolling cam rollers 443 along roller channel 442. Sensor flags and indication sensors may be placed at any location within drive assembly 350 such that the operational location of gate 324 is known to monitoring computers (e.g., open or closed position). For example, a sensor flag 522 may be attached to air cylinder block 440.

In this manner, when air cylinder block is raised towards top plate 404, a closed indication sensor 520 may detect that gate 324 has reached its closed position. The monitoring computer may be any suitable computer loaded with appropriate software to analyze the movements of drive assembly 350 and gate 324 relative to the moments of a robot arm that is located within transport chamber 300.

In addition, air cylinder block 440 may also include a second sensor flag 524. In this manner, when air cylinder block 440 is lowered after gate 324 is decompressed and opened, sensor flag 524 will disturb an optical path within an open indication sensor 526 that is attached to side wall 406. In another embodiment, various sensors may be located within roller channels 442 to detect the vertical location of cam rollers 443 as they move between the aforementioned closed and open position.

It should be appreciated that the information provided by the sensors and indicators generate critical information to the aforementioned computer system. Advantageously, gate 324 may be prevented for moving towards a closed position while a substrate transfer in or out of transport chamber 300 of FIG. 3A is in progress. Further, this position sensor mechanism could potentially prevent costly shutdowns that reduce throughput.

Figure 6:
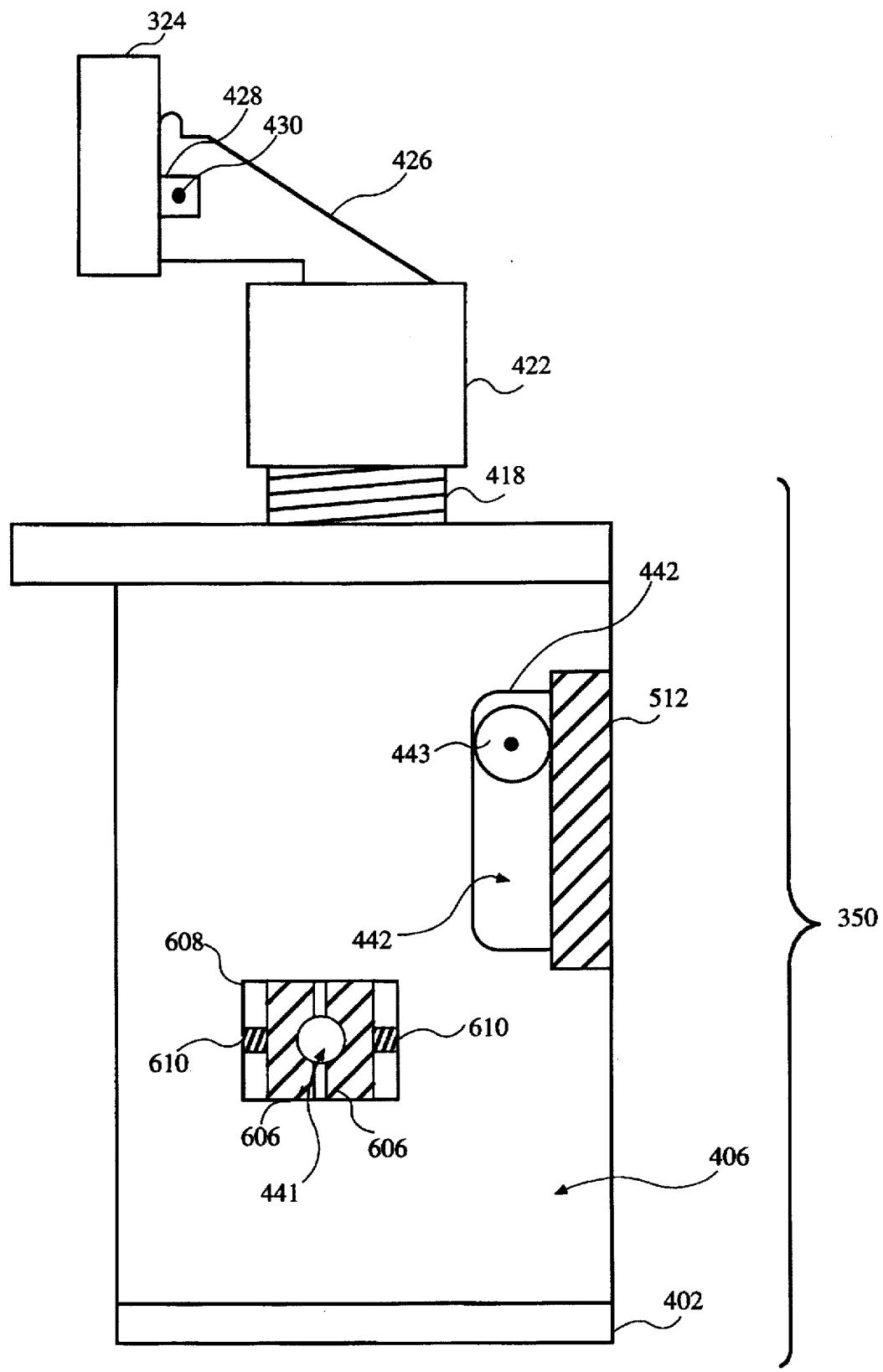
FIG. 6 is a side view of the gate drive valve of FIGS. 4 and 5A in accordance with one embodiment of the present invention.

FIG. 6 is a side view of drive assembly 350 and gate 324. As shown, side walls 406 are connected to bottom plate 402 and a top plate 404. From this perspective, hardened steel bar 512 is shown enclosing roller channel 442. Thus, cam rollers 443 may travel up and down when gate 324 is placed in a closed and open position, respectively. A side view of pin 441 is also shown being adjustably positioned within a horizontal adjustment window 608. This provides the aforementioned adjustability of beating block 408. Further, horizontal adjustment shoes 606 may be placed around pin 441 and adjusted by forcing adjustments shoes horizontally when screws 610 are tightened or loosened.

This perspective also shows welded bellows 418 contained within bellows shield 422 and proximate support bar 426. Thus, support bar 426 may be pivotally connected to gate 324 by inserting hinge pins 430 into pivot blocks 428. As mentioned above, hinge pins 430 and pivot blocks 428 provide gate 324 with axial movement to allow for a custom seal against the insert plate and O-rings (not shown for ease of illustration).

Although drive assembly 350 may have any height depending on the size of the chamber and interface port being sealed, a suitable height for drive assembly 350 and its corresponding internal components may be between about 100 millimeters and 1000 millimeters, and preferably at between about 250 millimeters and about 750 millimeters, and most preferably about 480 millimeters. Similarly, bottom plate 402 may have any footprint shape or size. By way of example, a suitable shape may be a square having preferred dimensions of between about 75 millimeters by 75 millimeters and about 400 millimeters by 400 millimeters, and more preferably, between about 100 millimeters by 100 millimeters and 300 millimeters by 300 millimeters, and most preferably about 200 millimeters by 200 millimeters.

Furthermore, the physical dimensions of gate 324 typically vary depending on many factors such as the size of the interface port being sealed and the size of the chamber in which drive assembly 350 is being implemented in. For this reason, the following dimensions are merely exemplary. Therefore, gate 324 will preferably have a horizontal width of between about 100 millimeters and 1,200 millimeters, and more preferably, between about 150 millimeters and 1,000 millimeters, and preferably at about 675 millimeters. The vertical height of gate 324 will preferably be between about 25 millimeters and 200 millimeters, and more preferably, between about 50 millimeters and 150 millimeters, and preferably about 200 millimeters. In this manner, gate 324 will adequately seal an interface port 316 (e.g., of FIG. 3A) having a preferred opening of about 650 millimeters by about 76 millimeters.

Furthermore, although side walls 406 may have any thickness capable of supporting the aforementioned mechanical interconnections, the preferred thickness of side walls 406 for this embodiment may be between about 1 centimeters and about 10 centimeters, and more preferably between about 2 centimeters and about 6 centimeters, and preferably about 3 centimeters. Bottom plate 402 may preferably have a thickness of between about 0.5 centimeter and 6 centimeters, and more preferably, between about 1 centimeters and about 4 centimeters, and preferably about 2 centimeters.

Top plate 404 may preferably have a thickness of between about 2.5 centimeters and about 20 centimeters, and more preferably, between about 5 centimeters and about 10 centimeters, and preferably about 7.5 centimeters.

Although the gate plate and drive assembly described in the various embodiments have direct application to interfaces between transport chambers and processing chambers, it should be borne in mind that these embodiments are equally applicable to any application where vacuum-tight interfaces between chambers are desired. In one particular embodiment, the substrates being processed in the processing chambers may be implemented to produce flat panel displays (FPDs) which are typically exposed to a number of etching processes within a cluster architecture implementing the above described gate drive valve embodiments.

By way of example, the invention may be practiced with one cluster architecture known by the trademark name "Continuum," available from Lam Research Corporation, of Fremont, Calif. However, it should be understood that the transport chamber 300 and its associated processing modules may be used to fabricate a variety of different articles of manufacture. By way of example, transport chamber 300 may be used to transport semiconductor wafers, disk drives, items needing metal plating or the like. Broadly speaking, the disclosed embodiments may also be used for depositing films, freeze drying foods and any other application implementing a gate drive valve.

Therefore, as described above, this invention advantageously provides a gate and drive assembly that establishes suitable isolation between interfacing chambers without increasing a cluster architecture's physical footprint in a clean room. Further, the structural integrity of the drive assembly is not disturbed by routine maintained. By way of example, drive assembly 350 may be effortlessly removed from a chamber without requiring the disassembly of the entire system.

Although the foregoing invention has been described in some detail for purposes of clarity of understanding, it will be apparent that certain changes and modifications may be practiced within the scope of the appended claims. In addition, although the preferred material used for drive assembly 350 is aluminum, any other material such as plain stainless steel, hardened stainless steel, alloy, etc., having sufficient strength and thickness may be used. Furthermore, the above described gate drive valve may also be mounted at any angle including up-side-down from above a chamber. Therefore, the present embodiments are to be considered as illustrative and not restrictive, and the invention is not to be limited to the details given herein, but may be modified within the scope and equivalence of the appended claims.

What is claimed is:

1. A method for implementing a gate drive valve assembly used to isolate a transport chamber from interfacing chambers, the transport chamber being configured to interface with a preselected number of processing chambers, comprising:

provided a drive assembly having top surface for attaching to the transport chamber, the drive assembly being mounted to the transport chamber such that a shaft contained within the drive assembly translates from the drive assembly through said top surface and along a bore in a bottom plate of the transport chamber;

mounting the drive assembly under the transport chamber; and attaching a gate plate to an end of the shaft when the shaft is at least partly within the chamber after translating along the bore.

2. The method for implementing a gate drive valve assembly as recited in claim 1, wherein the transport chamber is connected to a chamber selected from the group consisting essentially of a load lock, a flat panel display processing chamber, a deposition processing chamber, a disk drive processing chamber, and a semiconductor processing chamber.

3. The method for implementing a gate drive valve assembly as recited in claim 2, wherein the gate plate translates into one of an open position and a closed position from within the transport chamber.

4. The method for implementing a gate drive valve assembly as recited in claim 2, further including the substep of:

determining whether the drive assembly needs servicing;

if the drive assembly needs servicing, removing a view port window in the transport chamber to allow access to the interior of the transport chamber;

removing the gate plate from the shaft; and detaching the drive assembly from the bottom plate of the transport chamber once the gate plate has been removed from the shaft.

5. The method for implementing a gate drive valve assembly as recited in claim 2, further comprising the operations of:

providing a first sensor group consisting of a first sensor flag and a closed indication sensor installed within the drive assembly, such that the first sensor flag is installed to a top plate of the gate drive valve assembly and the closed indication sensor is installed to an air cylinder block to monitor a closed position of the gate plate; and providing a second sensor group consisting of a second sensor flag and an open indication sensor installed within the drive assembly, such that the second sensor flag is installed to a side wall of the gate drive valve assembly and the open indication sensor is installed to the air cylinder block to monitor an open position of the gate plate.

6. The method for implementing a gate drive valve assembly as recited in claim 2, wherein said at least one surface for attaching to the chamber includes a plurality of seals for isolating the chamber from atmospheric conditions during operation, and wherein at least one of the plurality of seals is an expandable welded bellows.

7. The method for implementing a gate drive valve assembly as recited in claim 3, wherein the gate plate is at least partly translated to the closed position by at least one actuation mechanism selected from the group consisting of gas springs, compression coil springs, air cylinders, and counter weights and pulleys.

8. The method for implementing a gate drive valve assembly as recited in claim 5, wherein monitoring is done by a computer system configured to interpret information provided by the sensors; and providing a safety latch capable of preventing closure of said gate when a transfer in and out of the transport chamber is in progress.

9. The method for implementing a gate drive valve assembly as recited in claim 4, wherein the actuation mechanism facilitates the initiation of a second lateral arc rotation which compress the gate plate to the closed position.

10. The method for implementing a gate drive valve assembly as recited in claim 5, wherein the second lateral arc rotation is performed after the actuation mechanism translates the shaft to a predefined vertical point.

11. The method for implementing a gate drive valve assembly as recited in claim 5, wherein the gate plate is shifted to the open position when the shaft rotates laterally away from the closed position and then translates downward towards the drive assembly.

12. An apparatus for establishing a seal between a transport chamber and interfacing chambers, said seal being established from within the transport chamber, the transport chamber being configured to interface with a preselected number of processing chambers, the apparatus comprising:

a drive assembly having at least one surface for attaching to said transport chamber from an under surface, and the drive assembly being mounted to the under surface of the transport chamber such that a shaft contained within the drive assembly is configured to translate from the drive assembly through said at least one surface and along a bore in the under surface of the transport chamber;

a gate plate fastened to an end of the shaft when the shaft is positioned at least partly within the transport chamber; and whereby mounting the drive assembly to the under surface of the transport chamber reduces a clean room footprint occupied by the transport chamber and drive assembly.

13. The apparatus for establishing a seal between interfacing chambers as recited in claim 12, wherein the bore in the transport chamber is defined through a bottom plate of the transport chamber.

14. The apparatus for establishing a seal between interfacing chambers as recited in claim 13, wherein the interfacing chambers are sealed against a side of the transport chamber and are selected from the group consisting essentially of flat panel display processing chambers, deposition processing chambers, disk drive processing chambers, and semiconductor processing chambers.

15. The apparatus for establishing a seal between interfacing chambers as recited in claim 14, wherein the gate plate translates into one of an open position and a closed position by translating through a first and a second motion path.

16. The apparatus for establishing a seal between interfacing chambers as recited in claim 15, wherein the first motion path is a vertical motion path which translates the shaft vertically from under the transport chamber at least partly into the transport chamber thereby at least partly raising the gate plate.

17. The apparatus for establishing a seal between interfacing chambers as recited in claim 15, wherein the second motion path is a lateral arc motion which translates the gate into a substantially compressed position against an insert plate and O-ring seal contained within the insert plate.

18. The apparatus for establishing a seal between interfacing chambers as recited in claim 16, wherein the first motion path is facilitated by at least one of a first and second actuation mechanism selected from the group consisting of gas springs, compression coil springs, air cylinders, and counter weights and pulleys.

19. The apparatus for establishing a seal between interfacing chambers as recited in claim 18, wherein the first actuation mechanism provides a biasing force to maintain an orientation of a 4-bar linkage.

20. The apparatus for establishing a seal between interfacing chambers as recited in claim 18, wherein the second actuation mechanism provides a force against an air cylinder block that is interconnected between a pair of linking arms, the force being provided by a pair of gas springs, each of the pair of gas springs having one end secured to a bottom plate of the drive assembly.

21. The apparatus for establishing a seal between interfacing chambers as recited in claim 20, wherein the pair of linking arms are coupled to a pair of cam rollers that travel along a roller channel defined within two side walls of the drive assembly.

22. The apparatus for establishing a seal between interfacing chambers as recited in claim 21, wherein the cam rollers travel against and apply forces to a hardened steel bar that defines part of the roller channel.

23. The apparatus for establishing a seal between interfacing chambers as recited in claim 15, wherein the gate plate has a horizontal dimension of between about 100 millimeters and about 1,200 millimeters.

24. The apparatus for establishing a seal between interfacing chambers as recited in claim 15, whereto the gate plate has a vertical dimension of between about 25 millimeters and 200 millimeters.

25. The apparatus for establishing a seal between interfacing chambers as recited in claim 15, wherein the vertical height of the drive assembly is between about 100 millimeters and about 1000 millimeters.

26. An apparatus for implementing a gate drive valve assembly used to isolate a transport chamber from interfacing chambers, the transport chamber being configured to interface with a preselected number of processing chambers, comprising:

a drive assembly means having a top surface for attaching to a bottom plate of said transport chamber containing a robot arm, the drive assembly being mounted to the bottom plate of the transport chamber such that a shaft contained within the drive assembly translates from the drive assembly through the top surface and along a bore in the bottom plate of the transport chamber;

means for attaching a gate plate to an end of the shaft when the shaft is at least partly within the chamber after translating along the bore;

a safety latch means located on a side wall of the drive assembly means, the safety latch means configured to prevent closure of the gate plate when a transfer in and out of the transport chamber by the robot arm is in progress; and means for sensing when the gate plate is in an open or closed position.

27. An apparatus for implementing a gate drive valve assembly as recited in claim 1, wherein the means for sensing comprises:

a first sensor group consisting of a first sensor flag and a closed indication sensor installed within the drive assembly means, such that the first sensor flag is installed to a top plate of the gate drive valve assembly means and the closed indication sensor is installed to an air cylinder block means to monitor a closed position of the gate plate; and a second sensor group consisting of a second sensor flag and an open indication sensor installed within the drive assembly means, such that the second sensor flag is installed to a side wall of the gate drive valve assembly means and the open indication sensor is installed to the air cylinder block to monitor an open position of the gate plate.

28. The apparatus for establishing a seal between interfacing chambers as recited in claim 27, wherein the gate plate has a horizontal dimension of between about 150 millimeters and about 1,000 millimeters, and a vertical dimension of between about 50 millimeters and 200 millimeters.

29. The apparatus for establishing a seal between interfacing chambers as recited in claim 28, wherein the gate plate has a substantial weight that produces a force on a pair of cam rollers that are substantially pressed against hardened steel bars that form at least part of a roller channel defined within two side walls of the drive assembly means.

* * * * *

UNITED STATES PATENT AND TRADEMARK OFFICE
CERTIFICATE OF CORRECTION

PATENT NO. : 5,667,197
DATED : September 16, 1997
INVENTOR(S) : Boyd et al

It is certified that error appears in the above-indentified patent and that said Letters Patent is hereby corrected as shown below:

Column 14, line 10, change "claim 1" to --claim 26--

Signed and Sealed this

Tenth Day of March, 1998

Attest:

BRUCE LEHMAN

*Attesting Officer*     Commissioner of Patents and Trademarks